(12) United States Patent
Benedetto (10) Patent No.: US 10,279,260 B2
(45) Date of Patent: May 7, 2019

(54) CUT-SCENE GAMEPLAY

(71) Applicant: Sony Interactive Entertainment LLC, San Mateo, CA (US)

(72) Inventor: Warren Benedetto, Aliso Viejo, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

(21) Appl. No.: 15/450,995

(22) Filed: Mar. 6, 2017

(65) Prior Publication Data

US 2018/0250593 A1 Sep. 6, 2018

(51) Int. Cl.
*A63F 13/47* (2014.01)
*A63F 13/53* (2014.01)

(52) U.S. Cl.
CPC .............. *A63F 13/53* (2014.09); *A63F 13/47* (2014.09)

(58) Field of Classification Search
CPC .......... A63F 13/10; A63F 13/47; A63F 13/52; A63F 13/54; A63F 2300/632
See application file for complete search history.

(56) References Cited

U.S. PATENT DOCUMENTS

| | | |
|---|---|---|
| 2006/0252533 A1 | 11/2006 | Sakaguchi et al. |
| 2008/0318676 A1 | 12/2008 | Ham |
| 2014/0082532 A1 | 3/2014 | Sheppard et al. |
| 2014/0274353 A1 | 9/2014 | Benson et al. |
| 2015/0174477 A1 | 6/2015 | Jackson et al. |
| 2016/0110838 A1 | 4/2016 | Humphries |

FOREIGN PATENT DOCUMENTS

| | | |
|---|---|---|
| WO | PCT/18/21173 | 3/2018 |
| WO | WO 2018/165175 | 9/2018 |

OTHER PUBLICATIONS

PCT Application No. PCT/US18/21173 International Search Report and Written Opinion dated May 10, 2018.
Sarkar, Samit; "Netflix launches interactive TV shows with branching narratives", Polygon.com; Jun. 20, 2017. https://www.polygon.com/tv/2017/6/20/15840982/netflix-interactive-tv-puss-in-boots.

*Primary Examiner* — Omkar A Deodhar
*Assistant Examiner* — Ross A Williams
(74) *Attorney, Agent, or Firm* — Polsinelli LLP (57) ABSTRACT

The systems and methods are directed towards cut-scene gameplay. Cut-scene gameplay refers to implementation of gameplay within different portions of a movie. The gameplay elements invite viewers to provide input that influences how the movie progresses. The movie may include many different branching storylines. In this way, different viewers are provided different experiences even though they may all be viewing the same general movie. Furthermore, subsequent viewing of the same movie may provide different experiences or at least encourage viewers to view the movie again in order to provide different inputs in hopes of obtaining different branches/or endings of the movie.

17 Claims, 5 Drawing Sheets

| Cut-scene ID | Gameplay ID | Conditions | Outcomes |
|---|---|---|---|
| 0001 | 0001 | A | 0002 |
| | | B | 0009 |
| | | C | 0015 |
| 0002 | 0002 | A | 0003 |
| | | B | 0004 |
| 0003 | N/A | N/A | 0005 |
| 0004 | N/A | N/A | 0006 |

CUT-SCENE GAMEPLAY

BACKGROUND

Field of Invention

The present invention generally relates to digital content such as movies or video games. More specifically, the present invention relates to cut-scene gameplay which incorporates elements of both movies and video games.

Description of the Related Art

Movies (i.e. films, motion pictures) are generally a recorded story or event shown to a viewer. Movies can be viewed in a variety of different ways such as on a screen in a movie theatre, at home on a computer or television, or on a mobile device such as a network or Internet-enabled phone or tablet. Despite the different ways movies can be shown to the viewer, the experience viewers have with the movie is generally the same: the viewer passively sits and views the events that are displayed before them associated with the movie. Each viewer views the same events or the same story-line each time that same movie is viewed.

Movies and/or movie-viewing venues may try and implement additional features to allow for additional user interaction. For example, the use of three-dimensional technology may make it seem to the viewer that objects within the movie are moving towards the user thereby immersing the viewer in the movie universe. Other movies may make use of the so-called 'fourth-dimension' utilizing such effects as simulations of rain, wind, lights (e.g. sunrise, sunset), or vibrations (e.g. earthquake). This additional 'dimension' may affect or interact with the user viewing the movie while corresponding to events within the movie (e.g., a rumbling effect as an earthquake takes place on screen).

With the use of three-dimensional and four-dimensional technology, there is attempt to provide more immersion for each viewer in connection with the currently viewed movie. This in turn may influence the satisfaction of the viewer viewing the movie.

However, despite how popular or well received a movie is, viewers may typically view the same movie only a handful of times at most. Most viewers may only view a particular movie once. Furthermore, the viewer experience is still passive in many cases. For the most part, the viewer will sit in their seat and view the events occurring within the movie even with the use of the three-dimensional and four-dimensional technology.

There is a need to provide more interactions (i.e. immersion) between the viewer and the movie. By having the viewer directly interact with the movie, the viewer would become more invested and in turn enjoy the movie more.

Furthermore, there is a need to influence the user to return and view the movie more than once by providing similar but different experiences each time. By providing a somewhat different experience each time, the viewer would be more inclined to view the content more than once and thus allow for additional income via sales (i.e. content or tickets), rentals, or advertisements to be available.

SUMMARY OF THE CLAIMED INVENTION

Embodiments of the present invention include systems and methods for implementing cut-scene gameplay is presently claimed. The system includes a server that stores cut-scene events, gameplay elements, and mapping details data and a computing device that receives the data, receives user input associated with the data and transmits the user input to the server to influence the next set of data to be received. The cut-scene events may include gameplay elements that encourage user interaction via user inputs. Various cut-scenes may be viewable by the user based on a combination of cut-scenes viewed previously by the user and/or user input obtained associated with the included gameplay elements. The mapping details dictate a sequence of cut-scene events and gameplay elements to be transmitted to the user based on previous user views and interactions.

DETAILED DESCRIPTION

The present disclosure describes methods and systems directed towards implementing cut-scene gameplay. As described herein, cut-scene gameplay refers to implementation of gameplay (i.e. game elements) within a plurality of different segments of a movie. A movie progress via a default branch of the storyline whereby incorporated gameplay invites one or more viewers to provide input that influences what will subsequently be displayed. For example, the viewer may be requested to provide input as simple (e.g. making a choice as to what door to open) or as complex (e.g. driving a vehicle) as desired by the cut-scene gameplay developer. These viewer inputs may also influence what will be displayed later on in the movie through the use of branching storylines.

In this way, different users may be provided different experiences via branching storylines and/or different endings while viewing the same movie. Furthermore, subsequent viewing of the same movie may provide different experiences or at least encourage viewers to view the movie again in order to provide different inputs in hopes of obtaining different branches of the story or different endings.

Cut-scenes (also known as in-game cinematics or in-game movies) are typically known to be a sequence in a video game that is not interactive and is used to break up gameplay within the video game. These cut-scenes are used to progress the story of the game by including conversations between characters or providing exposition to the player.

As used with the present application, however, cut-scenes refer to the plurality of segments (both interactive via gameplay elements and non-interactive allowing for passive viewing) into which a movie can be broken. Viewing a sequence of cut-scenes will provide a movie experience that is similar to movie experiences presently available. In the context of cut-scenes, a movie can typically be described as having a beginning, middle and an end. Each of those sections can be broken up into many different cut-scenes which each include one or more events used to facilitate the progression of the movie. Each of the cut-scenes would also follow a generally pre-determined sequential order so as to progress a story being expressed in the movie in an understandable manner.

The use of cut-scenes, however, will also allow for the creation and implementation of branching storylines. For example, a particular scene may have two or more possible outcomes. Based on a selected outcome (and corresponding scenes to be shown following a current scene), a first subset of scenes may be shown which would provide a different story from a second subset of scenes had a different outcome be chosen.

Gameplay elements refer to interactive elements that are incorporated into the cut-scenes that obtain some form of input from the user. These gameplay elements seek to involve the user instead of allowing the user to merely passively view what is being displayed. Gameplay elements can be simple or complex based on the developer's desire. Furthermore, these gameplay elements would be associated with the scene currently being viewed. For example, an example simple gameplay element may request a viewer's decision/choice as to which door to open, what objects should be collected prior to a trip, or what response to provide within a conversation. More complex gameplay elements may require the user to navigate a vehicle across an obstacle course, participate in a competition, or solve a puzzle within a pre-determined period of time.

Characters within the movie may come across a scenario where one or more of the above example gameplay elements may be inserted. The user, at this time, may provide an input that result in a selection of a subsequent scene. The selected subsequent scene may be one of many different possible scenes. In situations where the viewer does not provide an input for some reason (e.g. is currently away from the movie), the movie may progress via a default path using default inputs (or random inputs) if no viewer inputs were received.

Figure 1:
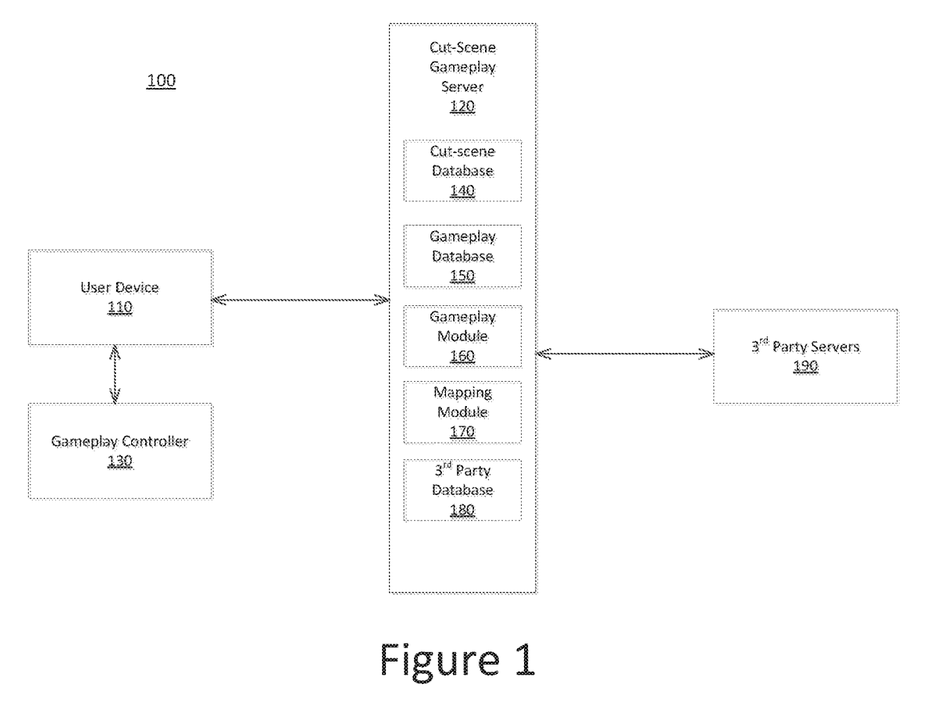
FIG. 1 is an exemplary system for implementing cut-scene gameplay

FIG. 1 is an exemplary system for implementing cut-scene gameplay 100. The system 100 includes a user device 110 and a cut-scene gameplay server 120. The user device 110 is used by the viewer to 1) view the cut-scenes and 2) interact with the cut-scene via incorporated gameplay elements. The cut-scene gameplay server 120 is used to provide the information needed to carry out the cut-scene gameplay described herein to the user devices 110. In particular, the cut-scene gameplay server 120 may be used to store the cut-scene events and data and gameplay elements to be incorporated into the cut-scenes. Further details regarding the various elements of the system 100 will be provided below.

The user device 110 is used by the viewer to 1) view the cut-scenes and 2) interact with the gameplay elements incorporated into the cut-scenes. There may be any number of different types of user devices 110 that may be compatible with displaying the cut-scenes and facilitating viewer interaction with the gameplay elements. Example user devices 110 may include consoles, virtual reality (VR) devices, laptops, desktops, mobile devices, and tablets. These user devices 110 may utilize any number of different types of operating systems (e.g. iOS, Android), applications or computing languages (e.g. C++, JavaScript). Further details regarding applicable user devices 110 will be provided below with respect to FIG. 2.

At the very least, the user device 110 should include at least 1) a way for the viewer to view the cut-scene events and corresponding data and 2) a way for the viewer to interact with the gameplay elements incorporated into the cut-scenes. With respect to 1), the user device 110 may include one or more displays associated with the user device 110. For example, the user device 110 may include a built-in display. In other embodiments, the user device 110 may be connected to an external display (e.g. monitor, television, VR display headset). Through the use of the external display (not shown), the user device 110 can transmit the cut-scene event and data to be displayed on the external display so that the viewer can view the cut-scene.

With respect to 2), the user device 110 may include a variety of different methods for receiving user input associated with the cut-scene. For example, a hardware device (i.e. controller) 130 may be associated with or connected to the user device that receives user input. The controller 130 may include a plurality of different buttons that the user can interact with to provide different types of input. Based on the user input provided from the controller 130, the user device 110 can process the input as corresponding to a particular choice or action within the cut-scene and corresponding data. Afterwards, the user device 110 may provide the user input to the cut-scene gameplay server 120. Further details regarding what is done to the user input once it reaches the cut-scene gameplay server 120 will be provided below.

It should be noted that the user may provide user input in other ways besides through the use of a controller 130. For example, the user device and/or controller 130 may include sensors used to obtain different types of input from the user. The controller 130 may include accelerometer or gyroscopes that allow motion to be detected with the controller. The controller 130 may also include a microphone so that voice commands may also be received from the user. In another embodiment, the user device 110 may include camera-based devices that can obtain gesture-based commands from the user. In each of these different examples, the input that is obtained from the viewer would be processed at the user device 110 into a format that is understandable by the cut-scene gameplay server 120. Afterwards, the user input is provided to the cut-scene gameplay server 120.

The user device 110 may also be able to incorporate additional functionality with the movie being viewed. For example, example functionality on the user device 110 may include the ability to 1) record a play-through/viewing session of the movie, 2) rewind to previous cut-scenes that the viewer has viewed during a current viewing session, and 3) fast forward to a cut-scene that the viewer has previously viewed.

With respect to recording, the viewer may be able to making a recording of all the cut-scenes and gameplay that occurred during a viewing session. This would generate a copy of a movie that would play out much like a typical movie. When the gameplay element portions of the cut-scenes would come out, the recorded user input would be automatically provided as if such choices were part of the cut-scene. This copy may be stored on the user device for viewing in the future. The viewer may also be provided the ability to share the copy of the movie to other user devices for viewing.

With respect to fast forwarding and rewinding to various cut-scenes within the movie, the user device 110 may allow the viewer to do so as long as the viewer previously viewed a particular cut-scene. A list of what cut-scenes the viewer has previously viewed may be stored on the user device 110 and/or the cut-scene gameplay server 120.

In a first example, if the viewer would like to redo a particular cut-scene and associated gameplay elements in order to obtain a different outcome, the viewer may choose to rewind to the start of the current cut-scene. The viewer may also choose to rewind back to a further cut-scene which may have started a branch in the storyline shown in the movie.

With respect to fast forwarding, this would allow the viewer to skip from one earlier cut-scene to a later cut-scene. However, the viewer would need to have viewed the later cut-scene (either in a current session or previous session) in order to skip to a particular part in the movie. The user device 110 may include a list of cut-scenes previously reviewed by the viewer that can be skipped to.

The limitations on the fast forward function would prevent the viewer from randomly viewing content that has not been unlocked. This limitation is more restrictive than what is employed in typical movies. However, the limitations ensure that viewers would need to perform the necessary choices or tasks in order to open up the different outcomes or branches in the storyline. This concern is not present in typical movies where there is only one storyline to follow.

In some embodiments, the feature of rewinding and/or fast forwarding may be disabled by the cut-scene gameplay server. This would prevent viewers from figuring out all the possible permutations of the movie via the different outcomes and choices too quickly. Other embodiments may limit a number of times a viewer can rewind and/or fast forward or require fulfillment of a condition (e.g. viewing an advertisement, payment) in order to rewind and/or fast forward.

Additional functionality at the user device 110 may also be possible although not described in detail herein. For example, the viewer may be able to share a current viewing session on the user device 110 with other user devices (i.e. streaming). Furthermore, the viewer may be able to provide comments about cut-scenes and/or the overall movie from the user device 110 to be transmitted to other user devices or to the cut-scene gameplay server 120. In this way, other viewers would be able to view the comments provided by the viewer regarding the cut-scene and/or overall movie.

The cut-scene gameplay server 120 is used to implement the cut-scene gameplay described herein with respect to the user device 110. In fact, the cut-scene gameplay server 120 is capable of communicating with a plurality of different user devices 110 simultaneously. Each user device 110, however, would be presented with different viewing experiences based on the user-input provided from each user device 110.

There may be a plurality of different cut-scene gameplay servers 120 which each have their own cut-scene database 140 and gameplay database 150. For example, a particular movie may have its own dedicated cut-scene gameplay server 120. In some embodiments, a company may own a cut-scene gameplay server 120 that is used to implement a plurality of cut-scene gameplay movies owned by that company. Each of the cut-scenes associated with a distinct movie may be stored in their own separate database. Similarly gameplay elements for distinct movies may be stored separately in their own respective gameplay databases as well. There is a benefit for separately stored data so that there is a reduced opportunity to mix up data that will be used for the cut-scene gameplay implementation sent to the user device 110.

Other embodiments may have all cut-scene data and/or gameplay element stored within the same database. For example, it may make sense to include all the gameplay elements within the same database especially in embodiments where similar gameplay elements appear within multiple cut-scenes of different movies.

As illustrated in FIG. 1, the cut-scene gameplay server 120 includes a variety of different elements such as the cut-scene database 140, the gameplay database 150, the gameplay module 160, the mapping module 170, and the third party database 180. Details regarding each element will be provided below. It should be noted that embodiments of the cut-scene gameplay server 120 may include more or less elements within the cut-scene gameplay server 120 as needed. For example, if no third party content is applicable, the third party database 180 may not be necessary. Other embodiments may allow multi-player or online gameplay interactions with the cut-scenes. The cut-scene gameplay server 120 may thus require additional databases and/or modules. Furthermore, some elements illustrated in FIG. 1 may be combined into one element. For example, it may be possible to have all cut-scene and gameplay data is stored within a common database. In any case, further details regarding each of the elements illustrated in FIG. 1 with respect to the cut-scene gameplay server 120 is provided below.

The cut-scene database 140 is used to store all cut-scenes data that can be transmitted to the viewer on the user device 110 to view. Cut-scene events and corresponding data can be generally viewed as segmented portions of a single movie that have associated identification that can be used to sequentially provide the cut-scenes to the viewer. Much like how some movies nowadays may allow viewers to jump around and skip to particular sections of the movie, each cut-scene can contain one or more events associated with the movie. These cut-scenes may be labeled in some way to facilitate identifying what is contained within a given cut-scene and/or identify an order in which the cut-scenes should be transmitted to the viewer on the user device 110.

In some embodiments the cut-scene database 140 will contain all the cut-scene events and data for a single movie. A movie typically viewed by a viewer will progress through the plurality of cut-scenes the same way each time. Therefore, the cut-scene database 140 can be used to provide the necessary cut-scenes in the correct order to view a movie as typically viewed.

Furthermore, by having the movie broken up into individual cut-scenes and stored in the cut-scene database 140 on the cut-scene gameplay server 120, the entire database 140 would not need to be downloaded and stored on the user device 110. Rather, only the necessary or predicted cut-scene data would need to be transmitted reducing the amount of overhead preparation (e.g. downloading) and storage needed at the user device 110 to view the movie.

However, the present invention also incorporates the use of alternative cut-scenes or branching storylines associated within the same movie. These alternative cut-scenes or branching storylines are associated with at least one cut-scene that has multiple possible outcomes. For example, based on a viewer's choice (e.g. which of the two doors to enter), a different cut-scene based on the viewer's choice can be provided to the viewer to view next after the current cut-scene has finished. The viewer's choice may be provided from the user device 110 as an input. In this way, a single cut-scene may have many possible outcomes each with their corresponding alternative cut-scene or string of cut-scenes (i.e. branching storyline). There may be situations where no user input has been detected after a pre-determined period of time. In this case, a default choice may be used automatically. In other cases, the current cut-scene may pause until some form of user input is received.

Individually, each piece of cut-scene data may include different elements. For example, the cut-scene event and its related data may include an introductory section and an ending portion where no gameplay elements may be present. These sections introduce time buffers that allow the cut-scene gameplay server 120 to receive user input and transmit subsequent cut-scene and gameplay data so that viewing of the movie on the user device 110 appears seamless. The introductory section and ending portion may also include identification information used to verify an order of the cut-scenes being provided. For example, the ending portion may identify which particular cut-scenes stored within the cut-scene database 140 may be possibly viewed next after the current cut-scene has been viewed.

Furthermore, each piece of cut-scene data may also include a portion which identifies which gameplay element should be incorporated. The gameplay elements are stored in the gameplay database 150. It may be possible to have the cut-scene database already include the gameplay elements (thereby eliminating the need to have a separate gameplay database 150). In some cases, the user may choose to have a default input (i.e. no input is provided from the user) so there may be no need to implement gameplay elements into the cut-scenes provided to the user device 110.

Gameplay elements may be as simple or as complex as desired. For example, gameplay elements may include simple tasks such as making a choice or responding to a question. More complex gameplay elements may include video-game type aspects where the viewer is able to control a character within the cut-scene. In each case, the gameplay elements may notify the viewer that user input is being requested. Furthermore, the cut-scene may include an indication as to a period of time in which input may be received. Absent any input (i.e. no input is detected from the user), a default or random input may be automatically provided. As noted above, embodiments may pause the cut-scene if the user desires that an input be provided at each available The gameplay elements are usable by the cut-scene gameplay server 120 to identify which subsequent cut-scene or cut-scenes should be provided to the viewer next on the user device 110. Which specific cut-scene or cut-scenes to be provided is identified through the use of the gameplay module 160 and the mapping module 170. Further details regarding each of these modules are provided below.

The gameplay module 160 may perform many different functions with respect to the cut-scene gameplay described herein. First, the gameplay module 160 may be responsible for combining separate cut-scenes and gameplay elements into a single data package that can be transmitted to the user device 110. The combination is based on instructions from the mapping module 170 which provides instructions as to which cut-scene data and which gameplay element should be retrieved and combined.

There may be embodiments where similar modules similar to the gameplay module 160 is included in the user device 110 that allows the user device 110 to assemble the cut-scene data with the corresponding gameplay elements. In this case, the cut-scene gameplay server 120 would transmit the cut-scene data and/or the gameplay elements as separate data packages. The user device 110 may have the information needed to combine the cut-scene data with the gameplay elements. If not, the user device 110 may need to receive such information from the cut-scene gameplay server 120 via the mapping module 170.

Second, the gameplay module 160 polls for user input from the user device 110 and processes the user input so that with the mapping module 170 the gameplay module 160 is able to determine which cut-scene and/or gameplay elements should be retrieved next.

The gameplay module 160 may also generate predictions as to which cut-scenes and/or gameplay elements the viewer may likely view in the future. These predictions may be based on previous input provided by the viewer. In some situations, alternative cut-scenes or branching storylines may not be unlocked yet so the gameplay module 160 is able to make a determination that a smaller subset of cut-scene events and/or gameplay elements would be viewed next on the user device 110.

Making predictions (via the gameplay module 160) as to which subset of cut-scene data and/or gameplay elements may be viewed next on the user device 110 is beneficial because such predictions allows the cut-scene gameplay server 120 to transmit the corresponding predicted data to the user device 110 beforehand and store the predicted data into a buffer for future use. In some cases, the transmission of the predicted data may be performed during a period of time when network traffic between the cut-scene gameplay server 120 and the plurality of user devices 110 is not busy. Furthermore, the predicted cut-scene and gameplay elements that are already stored on the user device 110 may be immediately used when applicable.

Typically, once user input is received from the viewer at the user device 110, there may be steps involved at the cut-scene gameplay server 120 that includes identifying the appropriate next cut-scene and/or gameplay elements to be transmitted to the user device 100. Once the appropriate cut-scene and/or gameplay elements have been identified, the cut-scene gameplay server 120 (via the gameplay module 160) may combine the data into a package that is usable by the user device 110. Once the packaged cut-scene and gameplay element has been generated, the package can then be transmitted to the user device 110. These steps between receiving the user input and the user device receiving the packaged gameplay element may be time consuming. By having the predicted data already stored on the user device 110, the cut-scene gameplay server 120 would only need to transmit information identifying which buffered data to use and potentially discard the remaining buffered data. The time between receiving user input and the user device 110 executing the buffered data may be significantly shorter.

The mapping module 170 includes information used by the gameplay module 160 and/or the user device 110 to identify which cut-scene and/or gameplay elements should be transmitted to the user device 110. In other words, the mapping module 170 would include a map of the cut-scene events and how each of the cut-scene and corresponding data is sequentially ordered. Furthermore, the mapping module 170 may include information (e.g. requirements, conditions for unlocking) regarding how a viewer can obtain a particular path through the story, cut-scene, and/or ending.

In a typical movie, or a movie with only one possible storyline, the mapping module 170 can be used to ensure that the cut-scenes are provided in the proper order to the user device 110. However, the mapping module 170 is more significant when each cut-scene has potentially two or more different outcomes that correspond to a different cut-scene or string of cut-scenes to be displayed.

Some choices may only influence a subsequent cut-scene. For example, if a viewer is provided a choice to open two boxes within a cut-scene, based on which box is selected, the viewer would view different cut-scenes showing the contents of the box that is opened. After that box is opened, the movie may progress as originally planned.

However, there may be some choices that may influences a string of cut-scenes based on what the viewer selects. For example, if the user needs to travel from point A to point B via one of three different vehicles (e.g. car, plane, boat), there may be multiple cut-scenes associated with the circumstances around the viewer's choice. The plane may be the most direct route and provide one set of cut-scenes showing arrival at point B safely. However, with respect to the car, there may be situations where problems arise (e.g.

traffic, car breakdown) that requires the viewer to take on additional choices or potentially change the destination from point B.

In an embodiment, the mapping database 170 would include all the possible paths that the viewer may experience from the beginning of the movie to the end. In some situations, the movie may have multiple endings, which in this case would require the mapping database 170 to provide the possible paths of how the viewer would obtain those different endings as well.

There may be some additional conditions that the mapping database 170 monitors to identify when particular cut-scenes may be viewable by the viewer. For example, the viewer may be provided promotional codes for accessing exclusive content. When redeemed, the viewer may be provided the opportunity to view alternative cut-scenes (e.g. endings) that would not have been available otherwise.

Other conditions may be based on an achievement-based system where the viewer would need to fulfill various criteria before being allowed access to particular cut-scenes. For example, the viewer may be required to view the main/default storyline first before being able to access any alternative storylines or endings during a subsequent viewing. In this way, the viewer may need to view the movie many times before being able to experience everything that the cut-scene database has stored with respect to the movie experience being consumed by the viewer.

Another example of an achievement based system implementation, may be that certain endings are restricted to viewers accomplishing high-scores or performing well in various cut-scene gameplay elements. A good ending may be provided where the viewer is successful in a majority of the gameplay while a different ending can be provided when the viewer is less successful.

In some embodiments, the achievement status may be tracked on the user device 110 and transmitted (when applicable) alongside any user input from the user device 110 to the cut-scene gameplay server 120. In other embodiments, the cut-scene gameplay server 120 may track achievements for each viewer and/or user device 110. The tracking of each user and/or user device 110 may be implemented via viewer profiles that the viewer would need to log into prior to viewing the movie. In this way, a record of what the viewer has done with respect to a given movie can be maintained.

Lastly, the cut-scene gameplay server 120 may include a third party database 180 used to store information (e.g. third party content) from various third party servers 190. Third party content may include advertisements or promotions associated with the movie/cut-scenes being viewed on the user device 110. As a marketing tool, movie companies may agree to work with various third parties to incorporate third party content into the movies. Third party content may include advertisements that can be inserted at pre-determined periods of time over the span of an entire movie (i.e. every three cut-scenes or every thirty minutes). In some situations, the third party content may also contain gameplay elements for the viewer to provide input with.

It may be possible that third party content can be used as a condition to unlock different possible cut-scenes (e.g. beginning, outcomes, endings). The condition may be based on viewing a number of the advertisements, based on the viewer's choice or the viewer's performance within the gameplay elements associated with the third party content.

As illustrated in FIG. 1, the system 100 may also include various third party servers 190. These third party servers 140 may be managed and operated by entities distinct from entities managing and operating the cut-scene gameplay server 120. In particular, the third party servers 140 are implemented so that additional content (e.g. advertisements) can be provided by third parties for use with the cut-scene gameplay server 120.

As described above, a third party entity may wish to insert advertisements (i.e. product placement) within the cut-scene gameplay associated with the cut-scene gameplay server 120. Such advertisements may include additional content that is unlockable from viewing the advertisements provided by the third party. In some other embodiments, the third party may provide gameplay elements that are specific to the third party (e.g. view certain advertisements or collect third-party related objects) to unlock the additional content.

Figure 2:
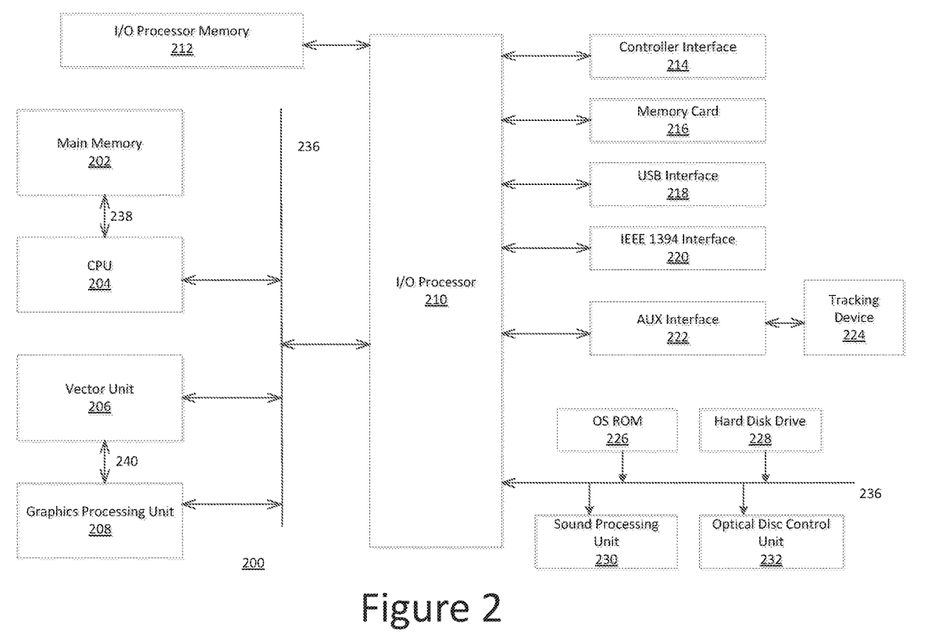
FIG. 2 is an exemplary user device.

FIG. 2 is an exemplary user device (i.e. client device as illustrated in FIG. 1) 200. The exemplary user device 200 (e.g., desktop, laptop, tablet, mobile device, console gaming system) is a device that the user can utilize to facilitate carrying out features of the present invention pertaining to interactions with the cut-scene gameplay.

The user device 200 may include various elements as illustrated in FIG. 2. It should be noted that the elements are exemplary and that other embodiments may incorporate more or less than the elements illustrated. With reference to FIG. 2, the user device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The user device 200 further includes an operating system read-only memory (OS ROM) 226, a sound processing unit 228, an optical disc control unit 230, and a hard disc drive 232, which are connected via a bus 234 to the I/O processor 210. The user device 200 further includes at least one tracking device 224.

The tracking device 224 may be a camera, which includes eye-tracking capabilities. The camera may be integrated into or attached as a peripheral device to user device 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to user device 200 that captures voice data. The microphone may conduct acoustic source localization and/or ambient noise suppression.

Alternatively, tracking device 224 may be the controller of the user device 200. The controller may use a combination of built-in accelerometers and infrared detection to sense its position in 3D space when pointed at the LEDs in a sensor nearby, attached to, or integrated into the console of the entertainment system. This design allows users to control functionalities of the user device 200 with physical gestures as well as button-presses. The controller connects to the user device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device 200 may be an electronic gaming console. Alternatively, the user device 200 may be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the user device 200 provides instructions via the controller interface 214 to the CPU 204. For example, the user may instruct the CPU 204 to store certain information on the memory card 216 or instruct the user device 200 to perform some specified action.

Other devices may be connected to the user device 200 via the USB interface 218, the IEEE 1394 interface 220, and the AUX interface 222. Specifically, a tracking device 224, including a camera or a sensor may be connected to the user device having the first party portal 200 via the AUX interface 222, while a controller may be connected via the USB interface 218.

Figure 3:
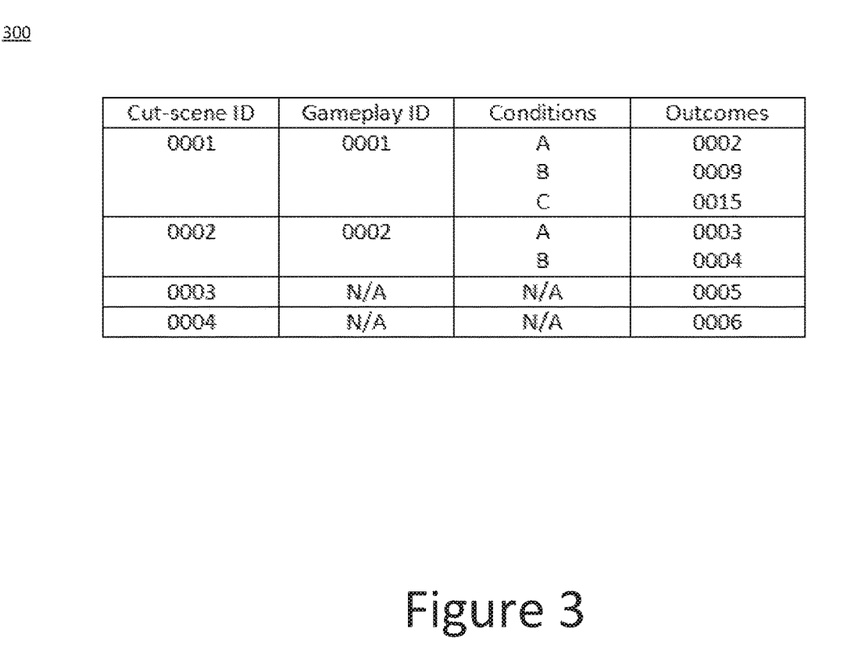
FIG. 3 illustrates an exemplary mapping database used by the mapping module.

FIG. 3 illustrates an exemplary mapping database 300 used by the mapping module. The mapping database 300 facilitates identifying the sequence of how cut-scenes should be played out during the movie. The mapping database 300 also identifies which gameplay elements should be provided alongside the corresponding cut-scene data. As illustrated in the figure, the mapping database 300 may include identification for each of the cut-scene and corresponding gameplay elements associated with the cut-scene data.

Also included in the mapping database 300 may also be identification of subsequent cut-scenes. In some instances, the mapping database 300 merely provides the next cut-scene in the sequence. These may correspond with situations where a cut-scene is provided to a viewer to view and includes no gameplay elements. Much like watching a typical movie, subsequent cut-scenes are transmitted to the user device prior to the completion of the current cut-scene so that the subsequent cut-scene is available when needed. This allows for transitions between cut-scenes from a viewing perspective to be seamless as if the cut-scenes were one continuous data file.

In some situations, the mapping database 300 may also include multiple possible 'outcomes' or cut-scenes that may follow a currently viewed cut-scene. As described above, the gameplay elements associated with the cut-scene event and data may influence what cut-scene will be shown after. The appropriate cut-scene corresponding to the viewer's input will be provided in order to provide a more immersive and interactive experience. This also allows viewers to obtain different experiences watching the movie each time.

With each of the different 'outcomes', the mapping database 300 may include the conditions required to unlock a particular outcome. One condition will typically be set as a 'default' condition which the viewer will obtain if they provide no input. It may be possible that the viewer can indicate to the user device that the default condition should always be chosen. In this way, subsequent cut-scenes can automatically be chosen (e.g. default choice or random choice) and transmitted to the user device in advance thereby emulating a typical movie.

Generally, the conditions correspond to the gameplay elements. For example, if the viewer is provided a choice of three options, there may be three possible outcomes and conditions associated with the viewer choosing between each of the options. The conditions listed in the mapping database 300 are used by the gameplay module to track which subsequent cut-scene and/or gameplay elements should be provided to the viewer.

Other conditions may correspond to how well or how poorly the viewer performed during a gameplay element. For example, if the viewer needs to drive a vehicle from point A to point B, various factors can be used to quantify how well the viewer performed the task. Based on how fast and/or how safe the viewer drove the vehicle, different outcomes can be provided.

Further conditions may be unlocked based on achievements obtained by the user during a current or past viewing. For example, one outcome may not be unlockable unless the viewer finished viewing the movie at least once. In another example, the viewer may be required to have obtained a particular cut-scene before having access to a potential choice in a later cut-scene. Viewing or interacting with third-party content may also be conditions for allowing viewer access to different outcomes. Other conditions may also be based on a particular time of day or day of the week or within a calendar year. It should be noted that there may be many other types of conditions not described above that may also be used to implement branching storylines via different possible outcomes or cut-scenes.

Figure 4:
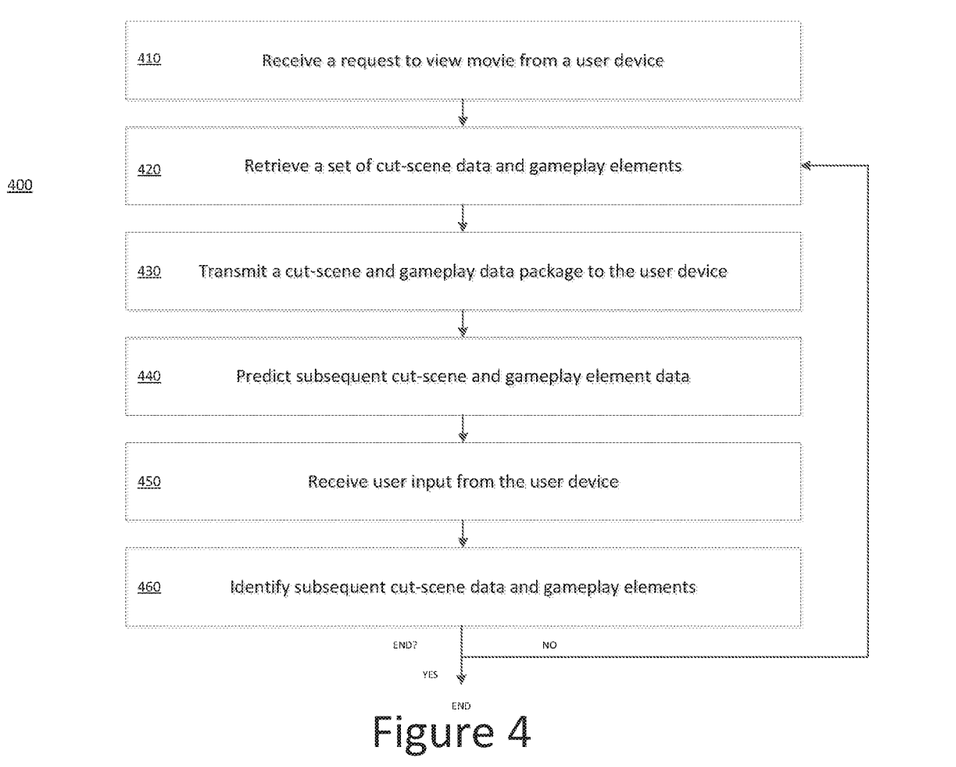
FIG. 4 illustrates a method for implementing cut-scene gameplay at the cut-scene gameplay server.

FIG. 4 illustrates a method 400 for implementing cut-scene gameplay at the cut-scene gameplay server. As described above with respect to FIG. 1, the cut-scene gameplay server may store the cut-scene data and the gameplay elements separately in their respective databases. The method 400 aims to retrieve the appropriate cut-scene data and combine it with the corresponding gameplay elements. The retrieval and combining of the data is carried out using the gameplay module and the mapping module. After the cut-scene data has been combined with the gameplay elements, the cut-scene gameplay server transmits the packaged data to the user device for viewing. Based on the input that is provided from the viewer at the user device, the cut-scene gameplay server can proceed with retrieving and combining subsequent cut-scene data and gameplay elements for subsequent packages. These packages will be assembled and transmitted to the user device before the user is finished with the current cut-scene being displayed on the user device. In this way subsequent assembled packages of cut-scene and gameplay data will be available for immediate use thereby providing a seamless transition between cut-scenes much like a typical movie.

In step 410, a notification is received at the cut-scene gameplay server from the user device indicating that the viewer would like to view a particular movie. This notification can be generated from an application stored on the user device where the application is designed to execute and display the cut-scene event and gameplay elements of the movie.

In step 420, based on the notification, the cut-scene gameplay server retrieves cut-scene data and gameplay elements from their respective databases. Information as to what needs to be retrieved may be based on information stored in the mapping database. For example, if the viewer is starting a new session for a movie, the gameplay module uses the mapping database to retrieve information as to which cut-scene data and gameplay elements should be provided that corresponds to the beginning of the movie. If the viewer is continuing from a previous session, the gameplay module would track a current progression within the movie for the viewer and then use the mapping database to provide the corresponding cut-scene and gameplay data for the viewer.

Once the gameplay module retrieves the cut-scene data and gameplay elements from each of the databases, they are subsequently combined at the gameplay module to generate a single cut-scene gameplay data packet that can be transmitted to the user device.

It should be noted that it may be possible to have the combination of the cut-scene events and data and gameplay elements be performed on the user device. If that is the case, the gameplay module may also retrieve additional mapping data to be transmitted alongside the cut-scene and gameplay data. The additional mapping data would describe how the user device should combine the cut-scene data and gameplay elements.

In step 430, the combined package of cut-scene and gameplay data is transmitted from the cut-scene gameplay server to the user device for viewing. The first transmitted package will generally be executed upon receipt by the user device. However, subsequently received packages will have a delayed execution time based on completion of the currently viewed cut-scene. Ideally, the packages will be received by the user device before the currently viewed cut-scene has finished so that the subsequent cut-scene can be executed thereby providing a seamless transition between cut-scenes.

In step 440, the cut-scene gameplay server performs predictions as to which subsequent cut-scenes and/or gameplay element data may be needed next. The predictions are used to prepare and transmit possible packages of cut-scene and gameplay data to the user device to be stored in a buffer.

The benefit of transmitting predicted packages beforehand is to facilitate the transition between the cut-scenes being displayed in a more seamless manner. Instead of having to wait until the user input is received from the user device and transmitting entire packages of data to the user device, the cut-scene gameplay server can instead perform the transmission earlier and once the user input is received can provide a notification. The former method may come across issues with available bandwidth at a given time (e.g. lag) and the transmission of the cut-scene and gameplay package may not be received in time by the user device. The latter method, although may include transmission of more data overall, would reduce the possibility of having a delay since merely transmitting an indication as to which buffered package on the user device would be quicker.

Although transmitting possible predictions may encompass transmission of more data overall, and thus present a greater burden on the network, the gameplay module can schedule transmission of predictions when network traffic is low. In situations where network traffic is high, the gameplay module may choose to send fewer predicted packages of data to the user device or choose to not to make any predictions at all.

With respect to making predictions, the gameplay module (alongside the mapping module) would know what possible next sets of cut-scene data and/or gameplay elements would be needed at the user device. For example, if a current cut-scene has three possible outcomes, the gameplay module may choose to send the three possible outcomes to the user device before the current cut-scene has finished and/or the viewer has provided a user input.

Furthermore, if any possible cut-scenes have not been unlocked or discovered yet by the viewer, the gameplay module can eliminate possible cut-scenes that can be transmitted to the viewer thereby reducing what may be transmitted to the user device.

In step 450, the cut-scene gameplay server receives a user input from the user device. Generally the user device and/or the gameplay module will poll for any form of input from the viewer for a pre-determined period of time. If no input is provided, or a default mode was previously selected by the viewer, the gameplay module may automatically choose which outcome (i.e. default path) should be transmitted to the viewer next. Otherwise, the user input is compared with the mapping database (stored in the mapping module) in order to identify subsequent cut-scenes to be transmitted to the user device.

In step 460, the next subsequent cut-scene gameplay will be identified based on the corresponding user input from the user device. In some cases, the next subsequent cut-scene gameplay data may already be stored on the user device (based on a previous prediction). In this case, a notification identifying which of the predicted data already stored on the user device should be used next is provided. Also, the notification may also indicate to the user device which predicted data stored on the user device can be deleted/ removed from storage (since such data may not be needed in the future) so as to free up storage for future predictions.

In situations where the predicted data is not available on the user device (i.e. the prediction was wrong), then the cut-scene gameplay server will need to perform steps 420 and 430 in order to provide the next subsequent data package to the user device based on the user input. Similarly, a notification can also be provided to the user device to indicate that some or all of the stored predictions may be deleted/removed from storage.

Since the cut-scene will have a period of time where no gameplay elements are implemented, there is a period of time that is built in that allows for the cut-scene gameplay server to retrieve the necessary cut-scene and gameplay data, combine the data into a packaged data set and transmit it to the user device for viewing in the case that a prediction was not accurate. This helps facilitate that the next package will be stored on the user device and ready for use as soon as the current cut-scene finishes. In this way, the viewer's experience viewing the cut-scene gameplay data is seamless much like watching a typical movie.

The method 400 will repeat (e.g. steps 420-460) until the last available cut-scene (i.e. ending scene) is provided to the viewer to view on the user device.

In summary, a viewer may have the opportunity, based on the movie, to view many different cut-scenes and provide many different inputs during a course of viewing a movie. This allows viewing experiences between different viewers as well as subsequent viewing experiences to be potentially different.

Figure 5:
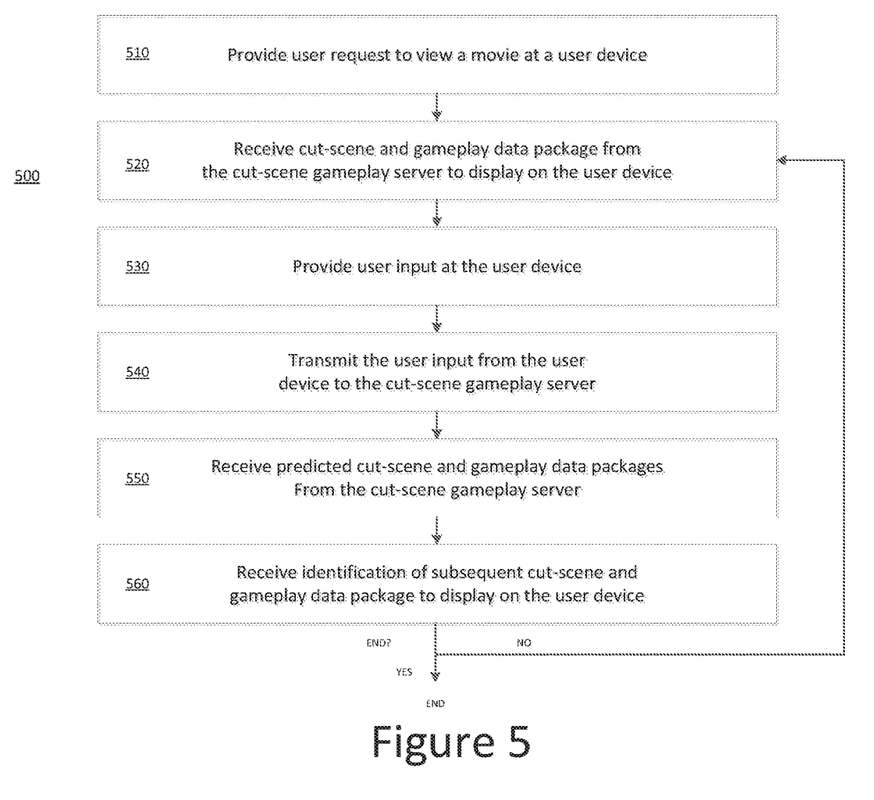
FIG. 5 illustrates a method for viewer interaction with cut-scene gameplay at the user device.

FIG. 5 illustrates a method 500 for viewer interaction with cut-scene gameplay at the user device. As described above with respect to FIG. 1, the user device is used to display the cut-scene data and gameplay elements for the viewer to view. Essentially, the viewer will experience the content as a typical movie with various points in time where user input is requested. The viewer is able to provide the input directly to the user device thereby influencing how the story within the movie progresses. However, it may also be possible for the viewer to provide no input or select a default mode that would have the cut-scene data play out with the gameplay elements automatically to resemble a typical movie.

In step 510, the viewer provides user input indicating a request to view a movie. This may correspond with a viewer interacting with an application stored on the user device (e.g. media player or other types of software) that can run the cut-scene gameplay packaged data. The user device transmits that request to the cut-scene gameplay server.

The viewer may also provide various custom options at this time. For example, the viewer may choose to skip to a particular cut-scene that was previously viewed. Furthermore, the viewer may also choose to implement a default or random input mode. These modes would allow the viewer to be more passive (e.g. the viewer would not need to provide inputs to progress the movie) in viewing the cut-scene event. These modes would allow the viewer to experience the move in a more typical manner.

In step 520, the user device receives cut-scene and gameplay data package from the cut-scene gameplay server. The data package is utilized by the user device so that the cut-scene is displayed on the user device for the viewer to view. Furthermore, the user device can set up the user device to receive user input from the viewer when the occasion arises during the viewing of the cut-scene.

In some embodiments, information associated with which cut-scenes have already been sent to the user device may be stored for future reference. Such information may be used in determining achievement-based requirements for different cut-scene outcomes later on in the movie. In other embodiments, such information may also dictate whether the viewer can fast forward or rewind to a particular cut-scene in the movie. As noted above, this information may be stored on the user device or associated with a user profile and stored on the cut-scene gameplay server.

In step 530, the user device provides a notification to the viewer that user input is requested. For example, the cut-scene may include a point in the story that requires a form of user input from the viewer such as a choice or completion of a task. This ensures that the viewer is aware that user input will be requested just in case the viewer has stepped away from the movie or is preoccupied with something else.

An example notification may include a vibration sent to a controller or an audio signal (i.e. bell) that is played. In some cases, the cut-scene may also be paused until the viewer confirms that the viewer is available to provide input. At this point, user input may be provided.

As described above, input can be provided any number of different ways. Example methods may include voice commands, touch via a touch screen on the user device, a controller that receives input from various buttons, gestures captured via a camera, and motion detected using sensors.

The user-device may poll for a user input for a predetermined period of time. If no input is provided, then a default input (or random input) is presumed in some cases. The user device may provide that no input was detected to the cut-scene gameplay server. In other cases, the user device may provide a default or random input if no input was detected from the viewer. Furthermore, embodiments may also have the cut-scene become paused until some form of user input is received from the viewer.

In step 540, the user input is transmitted to the cut-scene gameplay server. As described above, the user input is used by the gameplay module to determine the subsequent cut-scene data and gameplay elements to be transmitted next to the user device.

The user input may also be stored for future reference. The user input may be stored on the user device and/or the cut-scene gameplay server. As described above, the user input may be used for achievement-based purposes. Alternatively, a collection of choices or performances may influence cut-scenes (e.g. ending scenes) much later within the movie.

In step 550, the user device may receive predicted subsequent cut-scene gameplay data to be stored on the user device. The predicted cut-scene and gameplay packaged data would be stored in a buffer. Furthermore, the stored data would be identified as potential subsequent data to be used after the current cut-scene being viewed by the viewer.

In step 560, the user device may receive an indication as to the subsequent cut-scene gameplay data based on the user input if the cut-scene data is already stored on the user device. Otherwise, the user device may receive the next cut-scene gameplay package. Furthermore, the user device may also receive an indication as to which predicted cut-scene gameplay data not used by the user device can be deleted/removed thereby freeing up space for future storage of predicted data from the cut-scene gameplay server Steps 520-560 is repeated until the last cut-scene that is possible (i.e. ending) is provided to the user device for viewing. As described above, a viewer may have the opportunity, based on the movie, to view many different cut-scenes and provide many different inputs during a course of viewing a movie. This allows viewing experiences between different viewers as well as subsequent viewing experiences to be potentially different.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. An apparatus for implementing cut-scene gameplay, the apparatus comprising:
a memory that stores:
a plurality of cut-scene pre-recorded videos associated with a same storyline, wherein a subset of the cut-scene pre-recorded videos have been transmitted to a user device,
a plurality of gameplay elements associated with the plurality of cut-scene pre-recorded videos, wherein each of the plurality of gameplay elements corresponds to a different set of the cut-scene pre-recorded videos in a sequence within the storyline, and
a map that identifies a plurality of branches for the storyline, wherein each branch is associated with a different gameplay element;
a communication interface that:
transmits one of the cut-scene pre-recorded videos to the user device based on the subset of the cut-scene pre-recorded videos that have already been transmitted, and
receives gameplay data from the user device, the received gameplay data identifying an interaction with one or more of the gameplay elements; and
a processor that executes instructions stored in memory, wherein execution of the instructions by the processor:
identifies one of the branches within the map that is associated with the gameplay elements identified by the received gameplay data,
identifies the set of cut-scene pre-recorded video associated with the identified branch, and
identifies a next cut-scene pre-recorded video based on the sequence of the identified set of cut-scene pre-recorded video that is associated with the identified branch wherein the communication interface transmits the identified next cut-scene pre-recorded video to the user device.

2. The apparatus of claim 1, further comprising a database that stores insertable content elements, wherein each insertable content element is identified for insertion into the identified set of cut-scene pre-recorded videos based on one or more conditions.

3. The apparatus of claim 1, wherein the insertable content elements include advertisements.

4. The apparatus of claim 1, wherein the processor executes further instructions to generate a prediction regarding which of the cut-scene pre-recorded videos is most likely to be identified as the next cut-scene pre-recorded video, wherein generating the prediction is based on previously received gameplay data, and further comprising a buffer memory that loads the predicted cut-scene pre-recorded video.

5. The apparatus of claim 1, wherein the received gameplay data provided from the user device identifies the interaction via at least one of a touch screen, controller, camera, microphone, gyroscopes, and accelerometers.

6. The apparatus of claim 1, wherein the interaction with the one or more gameplay elements satisfy one or more conditions associated with unlocking the next cut-scene pre-recorded video.

7. The apparatus of claim 6, wherein the one or more conditions include achievement-based criteria for unlocking the next cut-scene pre-recorded video.

8. The apparatus of claim 6, wherein the interaction with the one or more gameplay elements satisfy a default condition when no gameplay data satisfying other conditions has been received during a pre-determined period of time from the user device.

9. A method for implementing cut-scene gameplay, the method comprising:
storing in memory:
a plurality of cut-scene pre-recorded videos associated with a same storyline, wherein a subset of the cut-scene pre-recorded videos have been transmitted to a user device,
a plurality of gameplay elements associated with the plurality of cut-scene pre-recorded videos, wherein each of the plurality of gameplay elements corresponds to a different set of the cut-scene pre-recorded videos in a sequence within the storyline, and
a map that identifies a plurality of branches for the storyline, wherein each branch is associated with a different gameplay element;
transmitting one of the cut-scene pre-recorded videos to the user device based on the subset of the cut-scene pre-recorded videos that have already been transmitted;
receiving gameplay data from the user device, the received gameplay data identifying an interaction with one or more of the gameplay elements;
identifying one of the branches within the map that is associated with the gameplay elements identified by the received gameplay data;
identifying the set of cut-scene pre-recorded video associated with the identified branch; and
identifying a next cut-scene pre-recorded video based on the sequence of the identified set of cut-scene pre-recorded video that is associated with the identified branch, wherein the identified next cut-scene pre-recorded video is transmitted to the user device.

10. The method of claim 9, further comprising storing insertable content elements in a database, wherein each insertable content element is identified for insertion into the identified set of cut-scene pre-recorded videos based on one or more conditions.

11. The method of claim 9, wherein the insertable content elements include advertisements.

12. The method of claim 9, further comprising:
generating a prediction regarding which of the cut-scene pre-recorded videos is most likely to be identified as the next cut-scene pre-recorded video, wherein generating the prediction is based on previously received gameplay data, and
loading the predicted cut-scene pre-recorded video into a buffer.

13. The method of claim 9, wherein the received gameplay data provided from the user device identifies the interaction via at least one of a touch screen, controller, camera, microphone, gyroscopes, and accelerometers.

14. The method of claim 9, wherein the interaction with the one or more gameplay elements satisfy one or more conditions associated with unlocking the next cut-scene pre-recorded video.

15. The method of claim 14, wherein the one or more conditions include achievement-based criteria for unlocking the next cut-scene pre-recorded video.

16. The method of claim 14, wherein the interaction with the one or more gameplay elements satisfy a default condition when no gameplay data satisfying other conditions has been received during a pre-determined period of time from the user device.

17. A non-transitory computer-readable storage medium, having embodied thereon a program executable by a processor to perform a method for implementing cut-scene gameplay, the method comprising:
  storing in memory:
    a plurality of cut-scene pre-recorded videos associated with a same storyline, wherein a subset of the cut-scene pre-recorded videos have been transmitted to a user device,
    a plurality of gameplay elements associated with the plurality of cut-scene pre-recorded videos, wherein each of the plurality of gameplay elements corresponds to a different set of the cut-scene pre-recorded videos in a sequence within the storyline, and
    a map that identifies a plurality of branches for the storyline, wherein each branch is associated with a different gameplay element,
  transmitting one of the cut-scene pre-recorded videos to the user device based on the subset of the cut-scene pre-recorded videos that have already been transmitted;
  receiving gameplay data from the user device, the received gameplay data identifying an interaction with one or more of the gameplay elements;
  identifying one of the branches within the map that is associated with the gameplay elements identified by the received gameplay data;
  identifying the set of cut-scene pre-recorded video associated with the identified branch; and
  identifying a next cut-scene pre-recorded video based on the sequence of the identified set of cut-scene pre-recorded video that is associated with the identified branch, wherein the identified next cut-scene pre-recorded video is transmitted to the user device.

* * * * *